US012425654B2

(12) United States Patent
Naser et al.

(10) Patent No.: US 12,425,654 B2
(45) Date of Patent: Sep. 23, 2025

(54) TRANSFORM SIZE INTERACTIONS WITH CODING TOOLS

(71) Applicant: InterDigital Madison Patent Holdings, SAS, Paris (FR)

(72) Inventors: Karam Naser, Mouazé (FR); Tangi Poirier, Thorigné-Fouillard (FR); Franck Galpin, Thorigné-Fouillard (FR); Ya Chen, Rennes (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 17/641,776

(22) PCT Filed: Sep. 8, 2020

(86) PCT No.: PCT/EP2020/074996
§ 371 (c)(1),
(2) Date: Mar. 9, 2022

(87) PCT Pub. No.: WO2021/048077
PCT Pub. Date: Mar. 18, 2021

(65) Prior Publication Data
US 2023/0143712 A1 May 11, 2023

(30) Foreign Application Priority Data

Sep. 13, 2019 (EP) .................................... 19306103
Sep. 20, 2019 (EP) .................................... 19306152

(51) Int. Cl.
H04N 19/625 (2014.01)
H04N 19/132 (2014.01)
(Continued)

(52) U.S. Cl.
CPC ......... *H04N 19/625* (2014.11); *H04N 19/132* (2014.11); *H04N 19/159* (2014.11); *H04N 19/176* (2014.11)

(58) Field of Classification Search
CPC .. H04N 19/625; H04N 19/132; H04N 19/159; H04N 19/176; H04N 19/103; H04N 19/12; H04N 19/157; H04N 19/70
(Continued)

(56) References Cited

U.S. PATENT DOCUMENTS 11,700,377 B2 * 7/2023 Koo .................. H04N 19/18
375/240.02
2008/0192824 A1 8/2008 Lim et al.
(Continued)

FOREIGN PATENT DOCUMENTS

CN 102308578 A 1/2012
CN 102986215 A 3/2013
(Continued)

OTHER PUBLICATIONS

Bross et al. "Versatile Video coding (Draft 6)", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O2001-vE, pp. 1-455 (Year: 2019).*
(Continued)

*Primary Examiner* — Christopher S Kelley
*Assistant Examiner* — Asmamaw G Tarko
(74) *Attorney, Agent, or Firm* — Condo Roccia Koptiw LLP

(57) ABSTRACT

Methods and apparatus for implementing Discrete Trigonometric transforms are based on maximum transform size. In one embodiment, matrix-based intra prediction is enabled for coding unit sizes up to a specified size, regardless of the maximum transform size. In another embodiment, low-
(Continued)

frequency non-separable transforms are used to improve coding gain. Syntax in a bitstream can be used to indicate a coding tool that is used.

22 Claims, 6 Drawing Sheets

(51) Int. Cl.
  *H04N 19/159* (2014.01)
  *H04N 19/176* (2014.01)
(58) Field of Classification Search
  USPC .................................................... 375/240.18
  See application file for complete search history.

(56) References Cited

U.S. PATENT DOCUMENTS

| | | | |
|---|---|---|---|
| 2011/0268183 A1 | 11/2011 | Sole et al. | |
| 2012/0008675 A1 | 1/2012 | Karczewicz et al. | |
| 2014/0286396 A1 | 9/2014 | Lee et al. | |
| 2016/0269730 A1 | 9/2016 | Jeon et al. | |
| 2020/0288131 A1 | 9/2020 | Zhao et al. | |
| 2020/0322636 A1* | 10/2020 | Egilmez | H04N 19/70 |
| 2022/0078450 A1* | 3/2022 | Salehifar | H04N 19/176 |
| 2022/0086486 A1* | 3/2022 | Lim | H04N 19/189 |
| 2022/0150544 A1 | 5/2022 | Deng et al. | |
| 2022/0256161 A1* | 8/2022 | Galpin | H04N 19/176 |
| 2022/0264085 A1* | 8/2022 | Galpin | H04N 19/593 |
| 2022/0345744 A1* | 10/2022 | LeLeannec | H04N 19/11 |
| 2023/0308654 A1* | 9/2023 | Koo | H04N 19/132 375/240.02 |
| 2024/0283910 A1* | 8/2024 | Ko | H04N 19/11 |

FOREIGN PATENT DOCUMENTS

| | | |
|---|---|---|
| CN | 103959794 A | 7/2014 |
| JP | 2022-542139 A | 9/2022 |
| KR | 20150011787 A | 2/2015 |
| WO | 2020/180769 A1 | 9/2020 |

OTHER PUBLICATIONS

Chen et al. "Algorithm description for Versatile Video Coding and Test Model 6 (VTM 6)", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O2002-v2, pp. 1-87 (Year: 2019).*

Kammoun, Ahmed, et al., "Hardware Acceleration of Approximate Transform Module for the Versatile Video Coding Standard", IEEE, 2019 27th European Signal Processing Conference (EUSIPCO), 2019, 5 pages.

Zhang, Z. et al, "Non-CE3: Enable MIP prediction for 64xN or Nx64 blocks at maximum transform size 32", Document: JVET-P0198-v1, Joint Video Experts Team (JVET) of ITU-T SG 16 WP 3 and ISO/IEC JTC 1/SC 29/WG 11, 16th Meeting: Geneva, CH, Oct. 1-11, 2019, 5 pages.

Zhao, Xin et al., "Non-CE6: Configurable max transform size in VVC", Document: JVET-O0545-v2, Joint Video Experts Team (JVET) of ITU-T SG 16 WP 3 and ISO/IEC JTC 1/SC 29/WG 11, 15th Meeting: Gothenburg, SE, Jul. 3-12, 2019, 6 pages.

Bross et al: "Versatile Video Coding (Draft 6)"; 127.MPEG Meeting; Jul. 3, 2019-Jul. 12, 2019; Gothenburg; (Motion Picture Expert Group or ISO/IEC JTC1/SC29/WG11), No. m49908 Jul. 31, 2019, pp. 1-439.

Naser, Karam, et al., "Non-CE6 / Non-CE3: MIP up To 64x64 CU's", Document: JVET-P0352, Joint Video Experts Team (JVET) of ITU-T SG 16 WP 3 and ISO/IEC JTC 1/SC 29/WG 11, 16th Meeting: Geneva, CH, Oct. 1-11, 2019, 4 pages.

Algorithm Description for Versatile Video Coding and test model 6 (VTM 6); 127. MPEG Meeting Jul. 8, 2019-Jul. 12, 2019 Gothenburg (Motion Picture Expert Group or ISO/IEC JTC1/SC29/WG11), No. M4991410 Sep. 2019, XP303208573.

* cited by examiner

TRANSFORM SIZE INTERACTIONS WITH CODING TOOLS

CROSS-REFERENCE TO RELATED APPLICATIONS

This application is a U.S. national stage application filed under 35 U.S.C. 371 of International Patent Application No. PCT/EP2020/074996, filed Sep. 8, 2020, which is a non-provisional filing of, and claims priority to and the benefit of European Patent Application Ser. No. 19/306,103.3, filed Sep. 13, 2019, and European Patent Application No. 19306152.0, filed Sep. 20, 2019, the entire contents of each of which are incorporated herein by reference as if fully set-forth herein in their respective entirety, for all purposes.

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

In the development of the Versatile Video Coding (WC) standard, a maximum transform size is variable between 32 and 64. The max transform size interacts with other transform coding tools.

SUMMARY

At least one of the present embodiments generally relates to a method or an apparatus for video encoding or decoding, and more particularly, to a method or an apparatus for interaction between max transform size and transform coding tools in a video encoder or a video decoder.

According to a first aspect, there is provided a method. The method comprises steps for enabling a coding tool based on a maximum transform size; performing at least a portion of a Discrete Trigonometric Transform on a subset of samples comprising a block; and, encoding the block using the enabled coding tool.

According to a second aspect, there is provided a method. The method comprises steps for enabling a coding tool based on a maximum transform size; performing at least a portion of an inverse Discrete Trigonometric Transform on a subset of samples comprising a block; and, decoding the block using the enabled coding tool.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
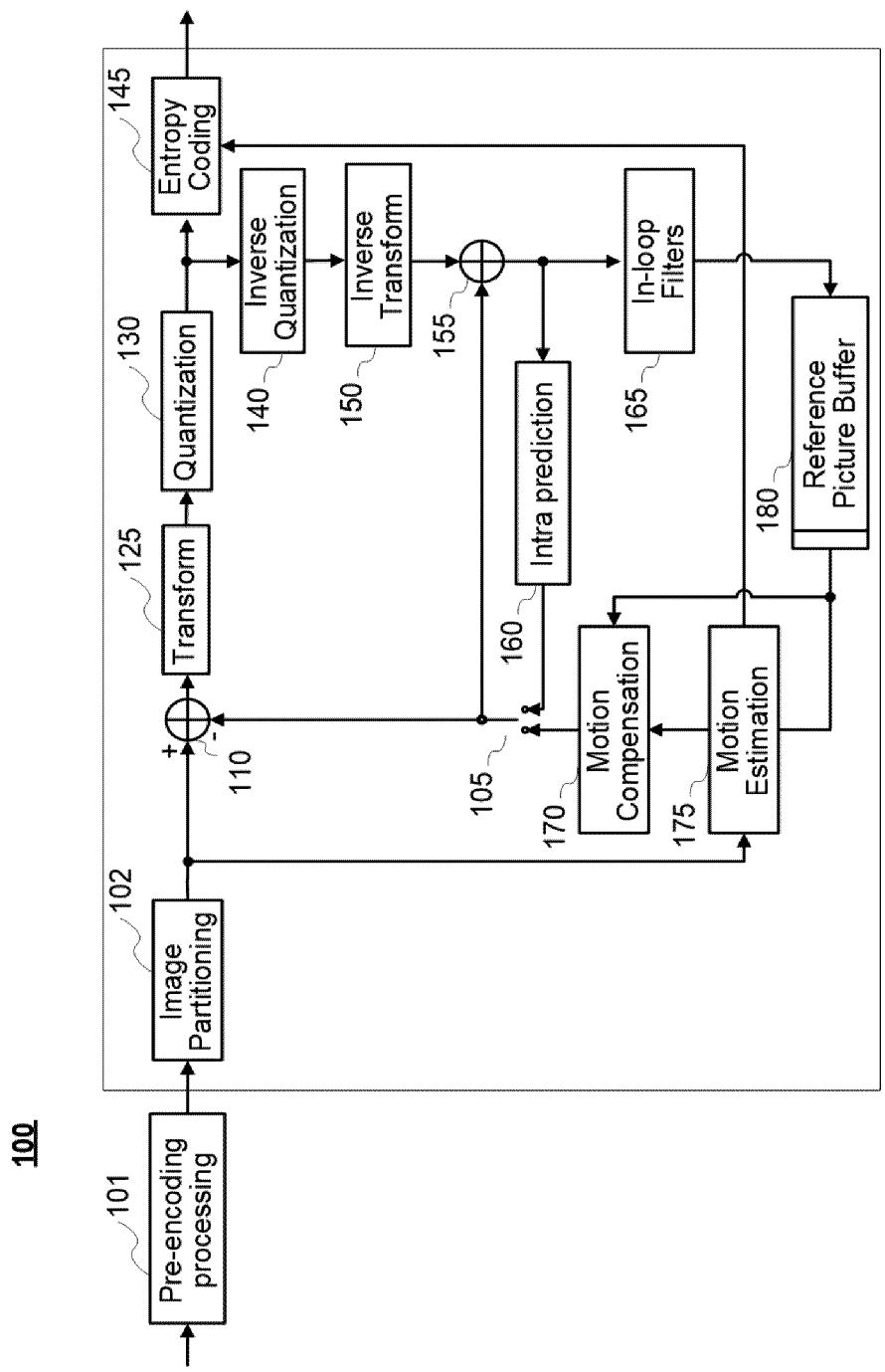
FIG. 1 shows a standard, generic video compression scheme

At least one of the present embodiments generally relates to a method or an apparatus for video encoding or decoding, and more particularly, to a method or an apparatus for interaction between max transform size and transform coding tools in a video encoder or a video decoder.

The general aspects described here are in the field of video compression. It is the interaction between the max transform size and the other transform coding tools, where in recent adoption of VVC the max transform size becomes variable between 32 and 64. Its value is computed as:

$$\text{MinTbLog2SizeY} = 2 \tag{7-27}$$

$$\text{MaxTbLog2SizeY} = \text{sps\_max\_luma\_transform\_size\_64\_flag} ? 6 : 5 \tag{7-28}$$

$$\text{MinTbSizeY} = 1 \ll \text{MinTbLog2SizeY} \tag{7-29}$$

$$\text{MaxTbSizeY} = 1 \ll \text{MaxTbLog2SizeY} \tag{7-30}$$

The maximum transform size interacts with the following tools:

1—Zero-out process: Initially, WC performs zero-out to reduce the complexity of large transforms size. For two-dimensional DCT2 transform, only the top-left 32×32 coefficients are kept while the rest is set to zero. That is, for 64×64, 64×32 and 32×32, DCT2 is performed to compute the first 32 coefficients in both horizontal and vertical directions Similarly, non DCT2 transforms (DST7 and DCT8) performs zero-out to retain the top left 16×16 coefficients. With the adoption of JVET-00545, it is not solved how the zero-out it performed when the maximum transform size is 32.

A capture of draft text is shown below, where the zero-out is shaded:

|  | Descriptor |
|---|---|
| residual_coding( x0, y0, log2TbWidth, log2TbHeight, cIdx ) { <br>  if( ( tu_mts_idx[ x0 ][ y0 ] > 0 \|\| <br>    ( cu_sbt_flag && log2TbWidth < 6 && <br>    log2TbHeight < 6 ) ) <br>    && cIdx = = 0 && log2TbWidth > 4 ) <br>  log2ZoTbWidth = 4 <br>  else <br>    log2ZoTbWidth = Min( log2TbWidth, 5 ) |  |
| MaxCcbs = 2 * ( 1 << log2TbWidth ) * ( 1<< log2TbHeight ) <br>  if( tu_mts_idx[ x0 ][ y0 ] > 0 \|\| <br>    ( cu_sbt_flag && log2TbWidth < 6 && <br>    log2TbHeight < 6 ) ) <br>    && cIdx = = 0 && log2TbHeight > 4 ) <br>  log2ZoTbHeight = 4 <br>  else <br>    log2ZoTbHeight = Min( log2TbHeight, 5 ) <br> ... |  |

This shows that if tu_mts_idx is greater than zero, which means MTS transforms are used (DST7,DST7), the zero-out width and height are set to 16, whereas the zero-out is set to 32 in case of tu_mts_idx is zero (DCT2).

2—MTS-Size: MTS, or multiple transform selection, is a transform tool adopted to VVC where selection between DST7 and DCT8 pairs is allowed as other transform pairs enhancing the DCT2 transform pair. MTS is performed for block sizes from 4×4 to 32×32. That is, half size DCT2. With the adoption of JVET-00545, it is not solved how the MTS-size is considered when the maximum transform size is 32.

A capture of draft text is shown below, where the mts size is shaded:

|  | Descriptor |
|---|---|
| transform_unit( x0, y0, tbWidth, tbHeight, treeType, subTuIndex, chType ) { <br>  if( ( treeType = = SINGLE_TREE \|\| treeType = = DUAL_TREE_CHROMA ) && <br>    ChromaArrayType != 0 ) { <br>    if( ( IntraSubPartitionsSplitType = = ISP_NO_SPLIT && !( cu_sbt_flag && <br>      ( ( subTuIndex = = 0 && cu_sbt_pos_flag ) \|\| <br>      ( subTuIndex = = 1 && !cu_sbt_pos_flag ) ) ) ) \|\| <br>      ( IntraSubPartitionsSplitType != ISP_NO_SPLIT && <br>      ( subTuIndex = = NumIntraSubPartitions − 1 ) ) ) { <br>      tu_cbf_cb[ x0 ][ y0 ] <br>      tu_cbf_cr[ x0 ][ y0 ] <br>    } <br>  } <br>  if( treeType = = SINGLE_TREE \|\| treeType = = DUAL_TREE_LUMA ) { <br>    if( ( IntraSubPartitionsSplitType = = ISP_NO_SPLIT && !( cu_sbt_flag && <br>      ( ( subTuIndex = = 0 && cu_sbt_pos_flag ) \|\| <br>      ( subTuIndex = = 1 && !cu_sbt_pos_flag ) ) ) && <br>      ( CuPredMode[ chType ][ x0 ][ y0 ] = = MODE_INTRA \|\| <br>      tu_cbf_cb[ x0 ][ y0 ] \|\| tu_cbf_cr[ x0 ][ y0 ] \|\| <br>      CbWidth[ chType ][ x0 ][ y0 ] > MaxTbSizeY \|\| <br>      CbHeight[ chType ][ x0 ][ y0 ] > MaxTbSizeY ) ) \|\| <br>      ( IntraSubPartitionsSplitType != ISP_NO_SPLIT && <br>      ( subTuIndex < NumIntraSubPartitions − 1 \|\| !InferTuCbfLuma ) ) ) <br>      tu_cbf_luma[ x0 ][ y0 ] <br>    if (IntraSubPartitionsSplitType != ISP_NO_SPLIT ) <br>      InferTuCbfLuma = InferTuCbfLuma && !tu_cbf_luma[ x0 ][ y0 ] <br>  } <br>  if( IntraSubPartitionsSplitType != ISP_NO_SPLIT && <br>    treeType = = SINGLE_TREE && subTuIndex = = NumIntraSubPartitions − 1 ) ) <br>    xC = CbPosX[ chType ][ x0 ][ y0 ] <br>    yC = CbPosY[ chType ][ x0 ][ y0 ] <br>    wC = CbWidth[ chType ][ x0 ][ y0 ] / SubWidthC <br>    hC = CbHeight[ chType ][ x0 ][ y0 ] / SubHeightC <br>  } else <br>    xC = x0 <br>    yC = y0 <br>    wC = tbWidth / SubWidthC <br>    hC = tbHeight / SubHeightC <br>  } <br>  if( ( CbWidth[ chType ][ x0 ][ y0 ] > 64 \|\| CbHeight[ chType ][ x0 ][ y0 ] > 64 \|\| <br>    tu_cbf_luma[ x0 ][ y0 ] \|\| tu_cbf_cb[ x0 ][ y0 ] \|\| tu_cbf_cr[ x0 ][ y0 ] ) && <br>    treeType != DUAL_TREE_CHROMA ) { <br>    if( cu_qp_delta_enabled_flag && !IsCuQpDeltaCoded ) { <br>      cu_qp_delta_abs <br>      if( cu_qp_delta_abs ) | <br><br><br><br><br><br>ae(v) <br>ae(v) <br><br><br><br><br><br><br><br><br><br><br>ae(v) <br><br><br><br><br><br><br><br><br><br><br><br><br><br><br><br><br>ae(v) |

| | Descriptor |
|---|---|
| ``` |  |
|             cu_qp_delta_sign_flag | ae(v) |
|       } |  |
|     } |  |
|     if( ( tu_cbf_cb[ x0 ][ y0 ] | | tu_cbf_cr[ x0 ][ y0 ] ) { |  |
|       if( cu_chroma_qp_offset_enabled_flag && !IsCuChromaQpOffsetCoded) { |  |
|         cu_chroma_qp_offset_flag | ae(v) |
|         if( cu_chroma_qp_offset_flag && chroma_qp_offset_list_len_minus1 > 0 ) |  |
|           cu_chroma_qp_offset_idx | ae(v) |
|       } |  |
|     } |  |
|     if( sps_joint_cbcr_enabled_flag && ( ( CuPredMode[ chType ][ x0 ][ y0 ] = = MODE_INTRA |  |
|         && ( tu_cbf_cb[ x0 ][ y0 ] | | tu_cbf_cr[ x0 ][ y0 ] ) ) | | |  |
|         ( tu_cbf_cb[ x0 ][ y0 ] && tu_cbf_cr[ x0 ][ y0 ] ) ) ) |  |
|       tu_joint_cbcr_residual_flag[ x0 ][ y0 ] | ae(v) |
|     if( tu_cbf_luma[ x0 ][ y0 ] && treeType != DUAL_TREE_CHROMA |  |
|         && ( tbWidth <= 32 ) && ( tbHeight <= 32 ) |  |
|         && ( IntraSubPartitionsSplit[ x0 ][ y0 ] = = ISP_NO_SPLIT ) && ( !cu_sbt_flag ) ) { |  |
|       if( sps_transform_skip_enabled_flag && !BdpcmFlag[ x0 ][ y0 ] && |  |
|           tbWidth <= MaxTsSize && tbHeight <= MaxTsSize ) |  |
|         transform_skip_flag[ x0 ][ y0 ] | ae(v) |
|       if( ( ( CuPredMode[ chType ][ x0 ][ y0 ] = = MODE_INTER && |  |
|           sps_explicit_mts_inter_enabled_flag ) |  |
|           | | ( CuPredMode[ chType ][ x0 ][ y0 ] = = MODE_INTRA && |  |
|           sps_explicit_mts_intra_enabled_flag ) ) && ( !transform_skip_flag[ x0 ][ y0 ] ) ) |  |
|         tu_mts_idx[ x0 ][ y0 ] | ae(v) |
|     } |  |
|     if( tu_cbf_luma[ x0 ][ y0 ] ) { |  |
|       if( !transform_skip_flag[ x0 ][ y0 ] ) |  |
|         residual_coding( x0, y0, Log2( tbWidth ), Log2( tbHeight ), 0 ) |  |
|       else |  |
|         residual_ts_coding( x0, y0, Log2( tbWidth ), Log2( tbHeight ), 0 ) |  |
|     } |  |
|     if( tu_cbf_cb[ x0 ][ y0 ] ) |  |
|       residual_coding( xC, yC, Log2( wC ), Log2( hC ), 1 ) |  |
|     if( tu_cbf_cr[ x0 ][ y0 ] && |  |
|         !( tu_cbf_cb[ x0 ][ y0 ] && tu_joint_cbcr_residual_flag[ x0 ][ y0 ] )) { |  |
|       residual_coding( xC, yC, Log2( wC ), Log2( hC ), 2 ) |  |
|     } |  |
| } |  |

This shows that MTS is signaled if both width and height are less than 32, regardless of MaxTbSizeY.

3—Chroma Transform Size: In WC, chroma size half luma size. That is, chroma transform blocks are allowed from 2×2 to 32×32, whereas luma size is for 4×4 to 64×64. With the adoption of JVET-O0545, it is not solved how the chroma size it fixed when the maximum transform size is 32.

In WC spec, the chroma size is computed as:

TABLE 6-1

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

$$\text{maxTbWidth} = (\text{cIdx}==0)?\text{MaxTbSizeY}:\text{MaxTbSizeY}/\text{SubWidthC} \quad (8\text{-}41)$$

$$\text{maxTbHeight} = (\text{cIdx}==0)?\text{MaxTbSizeY}:\text{MaxTbSizeY}/\text{SubHeightC} \quad (8\text{-}42)$$

Where cIdx is the color index (0 for luma and 1 for chroma).

In the common testing condition (CTC), the chroma format of 4:2:0 is used and maximum transform size (MaxTbSizeY) is 64. Therefore, the max transform size is 32 for chroma in CTC. However, if MaxTbSizeY is 32, then chroma maximum size is 16 according to the current SPEC.

4—Transform Skip Size: In WC, transform skip is performed for block sizes having the same range as DCT2. In other words, Transform Skip is performed for block sizes of 4×4 to 64×64. With the adoption of JVET-O0545, it is not solved how the Transform Skip size is fixed when the maximum transform size is 32.

In VVC specification, the maximum transform skip size is defined as:

log 2_transform_skip_max_size_minus2 specifies the maximum block size used for transform skip, and shall be in the range of 0 to 3.

When not present, the value of log 2_transform_skip_max_size_minus2 is inferred to be equal to 0.

The variable MaxTsSize is set equal to 1«(log 2_transform_skip_max_size_minus2+2).

That is, the maximum MaxTsSize can take values between 4 and 32, regardless of MaxTbSizeY value.

5. —BDCM Size: BD-PCM is Block-based Delta Pulse Code Modulation. It is a coding tool for transform skip residuals. Its currently allowed with the same size conditions as transform skip. That is, up to MaxTsSize. The text below shows the condition for coding BDPCM flag (shaded)

|  | Descriptor |
|---|---|
| coding_unit( x0, y0, cbWidth, cbHeight, cqtDepth, treeType, modeType ) { | |
|   chType = treeType = = DUAL_TREE_CHROMA? 1 : 0 | |
|   if( slice_type != I \|\| sps_ibc_enabled_flag \|\| sps_palette_enabled_flag) { | |
|     if( treeType != DUAL_TREE_CHROMA && | |
|       !( ( ( cbWidth = = 4 && cbHeight = = 4 ) \|\| modeType = = MODE_TYPE_INTRA ) | |
|       && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|     && !( cbWidth = = 4 && cbHeight = = 4 ) && modeType = = MODE_TYPE_ALL ) | |
|       pred_mode_flag | ae(v) |
|     if( ( ( slice_type = = I && cu_skip_flag[ x0 ][ y0 ] = =0 ) \|\| | |
|       ( slice_type != I && ( CuPredMode[ chType ][ x0 ][ y0 ] != MODE_INTRA \|\| | |
|         ( cbWidth = = 4 && cbHeight = = 4 && cu_skip_flag[ x0 ][ y0 ] = = 0 ) ) ) ) && | |
|       cbWidth <= 64 && cbHeight <= 64 && modeType != MODE_TYPE_INTER && | |
|       sps_ibc_enabled_flag && treeType != DUAL_TREE_CHROMA ) | |
|       pred_mode_ibc_flag | ae(v) |
|     if( ( ( ( slice_type = = I \|\| ( cbWidth = = 4 && cbHeight = = 4 ) \|\| sps_ibc_enabled_flag ) && | |
|         CuPredMode[ x0 ][ y0 ] = = MODE_INTRA ) \|\| | |
|       ( slice_type != I && !( cbWidth = = 4 && cbHeight = = 4 ) && !sps_ibc_enabled_flag | |
|         && CuPredMode[ x0 ][ y0 ] != MODE_INTRA ) ) && sps_palette_enabled_flag && | |
|       cbWidth <= 64 && cbHeight <= 64 && && cu_skip_flag[ x0 ][ y0 ] = = 0 && | |
|       modeType != MODE_INTER ) | |
|       pred_mode_plt_flag | ae(v) |
|   } | |
|   if( CuPredMode[ chType ][ x0 ][ y0 ] = = MODE_INTRA \|\| | |
|     CuPredMode[ chType ][ x0 ][ y0 ] = = MODE_PLT ) { | |
|     if( treeType = = SINGLE_TREE \|\| treeType = = DUAL_TREE_LUMA ) { | |
|       if( pred_mode_plt_flag ) { | |
|         if( treeType = = DUAL_TREE_LUMA ) | |
|           palette_coding( x0, y0, cbWidth, cbHeight, 0, 1 ) | |
|         else /* SINGLE_TREE */ | |
|           palette_coding( x0, y0, cbWidth, cbHeight, 0, 3 ) | |
|       } else { | |
|         if( sps_bdpcm_enabled_flag && | |
|           cbWidth <= MaxTsSize && cbHeight <= MaxTsSize ) | |
|           intra_bdpcm_flag | ae(v) |
|         if( intra_bdpcm_flag ) | |
|           intra_bdpcm_dir_flag | ae(v) |
|       ... | |

6—MIP

In VVC draft 6, the MIP (matrix-based intra prediction) is an intra prediction mode where the prediction signal is generated by multiplying the reference samples by some trained prediction matrices with constant shifts. The mode is signaled when the CU size is less than or equal to the maximum allowed transform size dimensions. This restriction was necessary to limit the memory requirement as well as the coding complexity. This is because MIP is a matrix based method, where the prediction matrices are larger for larger blocks.

Initially, the maximum transform size (MaxTbSizeY) is constantly kept as 64 in VTM5.0. However, in VTM6.0, this value can either be 64 or 32. A sample of the draft text of VTM6.0 is provided below (shaded part to indicate the MIP part):

|  | Descriptor |
|---|---|
| coding_unit( x0, y0, cbWidth, cbHeight, cqtDepth, treeType, modeType ) { | |
|   chType = treeType = = DUAL_TREE_CHROMA? 1 : 0 | |
|   if( slice_type != I \| \| sps_ibc_enabled_flag \| \| sps_palette_enabled_flag) { | |
|     if( treeType != DUAL_TREE_CHROMA && | |
|      !( ( ( cbWidth = = 4 && cbHeight = = 4 ) \| \| modeType = = MODE_TYPE_INTRA ) | |
|      && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|     && !( cbWidth = = 4 && cbHeight = = 4 ) && modeType = = MODE_TYPE_ALL ) | |
|       pred_mode_flag | ae(v) |
|     if( ( ( slice_type = = I && cu_skip_flag[ x0 ][ y0 ] = =0 ) \| \| | |
|       ( slice_type != I && ( CuPredMode[ chType ][ x0 ][ y0 ] != MODE_INTRA \| \| | |
|        ( cbWidth = = 4 && cbHeight = = 4 && cu_skip_flag[ x0 ][ y0 ] = = 0 ) ) ) ) && | |
|      cbWidth <= 64 && cbHeight <= 64 && modeType != MODE_TYPE_INTER && | |
|      sps_ibc_enabled_flag && treeType != DUAL_TREE_CHROMA ) | |
|       pred_mode_ibc_flag | ae(v) |
|     if( ( ( ( slice_type = = I \| \| ( cbWidth = = 4 && cbHeight = = 4 ) \| \| sps_ibc_enabled_flag ) && | |
|        CuPredMode[ x0 ][ y0 ] = = MODE_INTRA ) \| \| | |
|      ( slice_type != I && !( cbWidth = = 4 && cbHeight = = 4 ) && !sps_ibc_enabled_flag | |
|      && CuPredMode[ x0 ][ y0 ] != MODE_INTRA ) ) && sps_palette_enabled_flag && | |
|      cbWidth <= 64 && cbHeight <= 64 && && cu_skip_flag[ x0 ][ y0 ] = = 0 && | |
|      modeType != MODE_INTER ) | |
|       pred_mode_plt_flag | ae(v) |
|   } | |
|   if( CuPredMode[ chType ][ x0 ][ y0 ] = = MODE_INTRA \| \| | |
|     CuPredMode[ chType ][ x0 ][ y0 ] = = MODE_PLT ) { | |
|     if( treeType = = SINGLE_TREE \| \| treeType = = DUAL_TREE_LUMA ) { | |
|      if( pred_mode_plt_flag ) { | |
|       if( treeType = = DUAL_TREE_LUMA ) | |
|        palette_coding( x0, y0, cbWidth, cbHeight, 0, 1 ) | |
|       else /* SINGLE_TREE */ | |
|        palette_coding( x0, y0, cbWidth, cbHeight, 0, 3 ) | |
|      } else { | |
|       if( sps_bdpcm_enabled_flag && | |
|        cbWidth <= MaxTsSize && cbHeight <= MaxTsSize ) | |
|         intra_bdpcm_flag | ae(v) |
|       if( intra_bdpcm_flag ) | |
|        intra_bdpcm_dir_flag | ae(v) |
|       else { | |
|        if( sps_mip_enabled_flag && | |
|         ( Abs( Log2( cbWidth ) − Log2( cbHeight ) ) <= 2 ) && | |
|         cbWidth <= MaxTbSizeY && cbHeight <= MaxTbSizeY ) | |
|         intra_mip_flag[ x0 ][ y0 ] | ae(v) |
|        if( intra_mip_flag[ x0 ][ y0 ] ) | |
|         intra_mip_mode[ x0 ][ y0 ] | ae(v) |
|        else { | |
|         if( sps_mrl_enabled_flag && ( ( y0 % CtbSizeY ) > 0 ) ) | |
|          intra_luma_ref_idx[ x0 ][ y0 ] | ae(v) |
|         if ( sps_isp_enabled_flag && intra_luma_ref_idx[ x0 ][ y0 ] = = 0 && | |
|          ( cbWidth <= MaxTbSizeY && cbHeight <= MaxTbSizeY ) && | |
|          ( cbWidth * cbHeight > MinTbSizeY * MinTbSizeY ) ) | |
|          intra_subpartitions_mode_flag[ x0 ][ y0 ] | ae(v) |
|         if( intra_subpartitions_mode_flag[ x0 ][ y0 ] = = 1 ) | |
|          intra_subpartitions_split_flag[ x0 ][ y0 ] | ae(v) |
|         if( intra_luma_ref_idx[ x0 ][ y0 ] = = 0 ) | |
|          intra_luma_mpm_flag[ x0 ][ y0 ] | ae(v) |
|         if( intra_luma_mpm_flag[ x0 ][ y0 ] ) { | |
|          if( intra_luma_ref_idx[ x0 ][ y0 ] = = 0 ) | |

| | Descriptor |
|---|---|
| `        intra_luma_not_planar_flag[ x0 ][ y0 ]` | ae(v) |
| `        if( intra_luma_not_planar_flag[ x0 ][ y0 ] )` | |
| `          intra_luma_mpm_idx[ x0 ][ y0 ]` | ae(v) |
| `      } else` | |
| `        intra_luma_mpm_remainder[ x0 ][ y0 ]` | ae(v) |
| `      }` | |
| `    }` | |
| `  }` | |
| `}` | |
| `...` | |

Where MaxTbSizeY value was fixed to 64. However, with the adoption of JVET-O0545, MaxTbSizeY can be either 64 or 32.

Intuitively, if MaxTbSizeY is 32, MIP is signaled up to CU sizes of 32×32. This prevents larger CU's from using MIP and therefore limits the coding efficiency. The current described aspects propose enabling MIP for CU's up to 64×64, regardless of the maximum transform size. This is done by enabling TU tiling when the CU size is larger than MaxTbSizeY.

Initially, the maximum transform size is constantly kept as 64 in VTM5.0. However, with the recent adoption of JVET-O0545, the maximum transform size (MaxTbSizeY) can be either 64 or 32, which is controlled by the SPS flag (sps_sbt_max_size_64_flag). When this happens, the Zero-out process, MTS-Size, Chroma Transform Size, transform skip size and BDCM Size need to be adapted to this changes.

The general aspects propose to adapt the signaling of the following tools according to the maximum transform size: Zero-out process, MTS-Size, Chroma Transform Size, transform skip size and BDCM. The impacted codec module is the intra coding design (160) and 260 of FIGS. 1 and 2.

Embodiment 1: Zero-Out Process

In this embodiment, the zero-out process depends on the maximum transform size. In this way, if the maximum size is 32 instead of 64, the zero-out size is reduced to half. This is indicated in the text below (in italics)

| | Descriptor |
|---|---|
| `residual_coding( x0, y0, log2TbWidth, log2TbHeight, cIdx ) {` | |
| `  if( ( tu_mts_idx[ x0 ][ y0 ] > 0 | |` | |
| `      ( cu_sbt_flag && log2TbWidth < 6 && log2TbHeight < 6 ) )` | |
| `      && cIdx = = 0 && log2TbWidth > 4 )` | |
| `    log2ZoTbWidth = 4` | |
| `  else` | |
| `    log2ZoTbWidth = Min( log2TbWidth, 5 )` | |
| `    if (sps_max_luma_transform_size_64_flag = = 0)` | |
| `      log2ZoTbWidth = log2ZoTbWidth − 1` | |
| `  MaxCcbs = 2 * ( 1 << log2ZoTbWidth ) * ( 1<< log2TbHeight )` | |
| `  if( tu_mts_idx[ x0 ][ y0 ] > 0 | |` | |
| `      ( cu_sbt_flag && log2TbWidth < 6 && log2TbHeight < 6 ) )` | |
| `      && cIdx = = 0 && log2TbHeight > 4 )` | |
| `    log2ZoTbHeight = 4` | |
| `  else` | |
| `    log2ZoTbHeight = Min( log2TbHeight, 5 )` | |
| `    if (sps_max_luma_transform_size_64_flag = = 0)` | |
| `      log2ZoTbHeight = log2ZoTbHeight − 1` | |
| `...` | |

This can also be done independently for DCT2 transform and other MTS transforms (DST7 and DCT8). That is, if we want to do it for DCT2 only:

| | Descriptor |
|---|---|
| `residual_coding( x0, y0, log2TbWidth, log2TbHeight, cIdx ) {` | |
| `  if( ( tu_mts_idx[ x0 ][ y0 ] > 0 | |` | |
| `      ( cu_sbt_flag && log2TbWidth < 6 && log2TbHeight < 6 ) )` | |
| `      && cIdx = = 0 && log2TbWidth > 4 )` | |
| `    log2ZoTbWidth = 4` | |
| `  else` | |
| `    log2ZoTbWidth = Min( log2TbWidth, 5 )` | |
| `    if (sps_max_luma_transform_size_64_flag = = 0 && tu_mts_idx[ x0 ][ y0 ] = = 0 )` | |
| `      log2ZoTbWidth = log2ZoTbWidth − 1` | |
| `  MaxCcbs = 2 * ( 1 << log2ZoTbWidth ) * ( 1<< log2TbHeight )` | |
| `  if( tu_mts_idx[ x0 ][ y0 ] > 0 | |` | |
| `      ( cu_sbt_flag && log2TbWidth < 6 && log2TbHeight < 6 ) )` | |
| `      && cIdx = = 0 && log2TbHeight > 4 )` | |

-continued

| | Descriptor |
|---|---|
|    log2ZoTbHeight = 4<br>else<br>   log2ZoTbHeight = Min( log2TbHeight, 5 )<br> if (sps_max_luma_transform_size_64_flag = = 0 && tu_mts_idx[ x0 ][ y0 ] = = 0)<br>   log2ZoTbHeight = log2ZoTbHeight − 1<br>... | |

Otherwise, for DST7/DCT8 only

| | Descriptor |
|---|---|
| residual_coding( x0, y0, log2TbWidth, log2TbHeight, cIdx ) {<br>  if( ( tu_mts_idx[ x0 ][ y0 ] > 0 \|\|<br>    ( cu_sbt_flag && log2TbWidth < 6 && log2TbHeight < 6 ) )<br>    && cIdx = = 0 && log2TbWidth > 4 )<br>    log2ZoTbWidth = 4<br>  else<br>    log2ZoTbWidth = Min( log2TbWidth, 5 )<br>  if (sps_max_luma_transform_size_64_flag = = 0 && tu_mts_idx[ x0 ][ y0 ] > 0 )<br>    log2ZoTbWidth = log2ZoTbWidth − 1<br>  MaxCcbs = 2 * ( 1 << log2TbWidth ) * ( 1<< log2TbHeight )<br>  if( tu_mts_idx[ x0 ][ y0 ] > 0 \|\|<br>    ( cu_sbt_flag && log2TbWidth < 6 && log2TbHeight < 6 ) )<br>    && cIdx = = 0 && log2TbHeight > 4 )<br>    log2ZoTbHeight = 4<br>  else<br>    log2ZoTbHeight = Min( log2TbHeight, 5 )<br>  if (sps_max_luma_transform_size_64_flag = = 0 && tu_mts_idx[ x0 ][ y0 ] > 0)<br>    log2ZoTbHeight = log2ZoTbHeight − 1<br>... | |

Embodiment 2: MTS-Size

MTS signaling is allowed up to sizes of 32×32. This is independent from MaxTbSizeY, whether it is 64 or 32. To make the connection with MaxTbSizeY, we can allow the signaling of MTS to sizes up to MaxTbSizeY/2×MaxTbSizeY/2. This is indicated in the spec below in italics:

| | Descriptor |
|---|---|
| transform_unit( x0, y0, tbWidth, tbHeight, treeType, subTuIndex, chType ) {<br>  if( ( treeType = = SINGLE_TREE \|\| treeType = = DUAL_TREE_CHROMA ) &&<br>    ChromaArrayType ! = 0 ) {<br>   if( ( IntraSubPartitionsSplitType = = ISP_NO_SPLIT && !( cu_sbt_flag &&<br>      ( ( subTuIndex = = 0 && cu_sbt_pos_flag ) \|\|<br>      ( subTuIndex = = 1 && !cu_sbt_pos_flag ) ) ) ) \|\|<br>    ( IntraSubPartitionsSplitType != ISP_NO_SPLIT &&<br>    ( subTuIndex = = NumIntraSubPartitions − 1 ) ) ) {<br>    tu_cbf_cb[ x0 ][ y0 ] | ae(v) |
|     tu_cbf_cr[ x0 ][ y0 ]<br>   }<br>  }<br>  if( treeType = = SINGLE_TREE \|\| treeType = = DUAL_TREE_LUMA ) {<br>   if( ( IntraSubPartitionsSplitType = = ISP_NO_SPLIT && !( cu_sbt_flag &&<br>     ( ( subTuIndex = = 0 && cu_sbt_pos_flag ) \|\|<br>     ( subTuIndex = = 1 && !cu_sbt_pos_flag ) ) ) &&<br>    ( CuPredMode[ chType ][ x0 ][ y0 ] = = MODE_INTRA \|\|<br>     tu_cbf_cb[ x0 ][ y0 ] \|\| tu_cbf_cr[ x0 ][ y0 ] \|\|<br>     CbWidth[ chType ][ x0 ][ y0 ] > MaxTbSizeY \|\|<br>     CbHeight[ chType ][ x0 ][ y0 ] > MaxTbSizeY ) ) \|\|<br>    ( IntraSubPartitionsSplitType != ISP_NO_SPLIT &&<br>    ( subTuIndex < NumIntraSubPartitions − 1 \|\| !InferTuCbfLuma ) ) )<br>    tu_cbf_luma[ x0 ][ y0 ] | ae(v)<br>ae(v) |
|    if (IntraSubPartitionsSplitType != ISP_NO_SPLIT )<br>    InferTuCbfLuma = InferTuCbfLuma && !tu_cbf_luma[ x0 ][ y0 ]<br>  }<br>  if( IntraSubPartitionsSplitType != ISP_NO_SPLIT &&<br>    treeType = = SINGLE_TREE && subTuIndex = = NumIntraSubPartitions − 1 ) )<br>   xC = CbPosX[ chType ][ x0 ][ y0 ] | |

```
            yC = CbPosY[ chType ][ x0 ][ y0 ]
            wC = CbWidth[ chType ][ x0 ][ y0 ] / SubWidthC
            hC = CbHeight[ chType ][ x0 ][ y0 ] / SubHeightC
         } else
            xC = x0
            yC = y0
            wC = tbWidth / SubWidthC
            hC = tbHeight / SubHeightC
      }
      if( ( CbWidth[ chType ][ x0 ][ y0 ] > 64 | | CbHeight[ chType ][ x0 ][ y0 ] > 64 | |
        tu_cbf_luma[ x0 ][ y0 ] | | tu_cbf_cb[ x0 ][ y0 ] | | tu_cbf_cr[ x0 ][ y0 ] ) &&
        treeType != DUAL_TREE_CHROMA ) {
         if( cu_qp_delta_enabled_flag && !IsCuQpDeltaCoded ) {
            cu_qp_delta_abs                                                                ae(v)
            if( cu_qp_delta_abs )
               cu_qp_delta_sign_flag                                                       ae(v)
         }
      }
      if( ( tu_cbf_cb[ x0 ][ y0 ] | | tu_cbf_cr[ x0 ][ y0 ] ) {
         if( cu_chroma_qp_offset_enabled_flag && !IsCuChromaQpOffsetCoded) {
            cu_chroma_qp_offset_flag                                                       ae(v)
            if( cu_chroma_qp_offset_flag && chroma_qp_offset_list_len_minus1 > 0 )
               cu_chroma_qp_offset_idx                                                     ae(v)
         }
      }
      if( sps_joint_cbcr_enabled_flag && ( ( CuPredMode[ chType ][ x0 ][ y0 ] = = MODE_INTRA
        && ( tu_cbf_cb[ x0 ][ y0 ] | | tu_cbf_cr[ x0 ][ y0 ] ) ) | |
        ( tu_cbf_cb[ x0 ][ y0 ] && tu_cbf_cr[ x0 ][ y0 ] ) ) )
         tu_joint_cbcr_residual_flag[ x0 ][ y0 ]                                           ae(v)
      if( tu_cbf_luma[ x0 ][ y0 ] && treeType != DUAL_TREE_CHROMA
        && ( tbWidth <= MaxTrSizeY/2 ) && ( tbHeight <= MaxTrSizeY/2 )
        && ( IntraSubPartitionsSplit[ x0 ][ y0 ] = = ISP_NO_SPLIT ) && ( !cu_sbt_flag ) ) {
         if( sps_transform_skip_enabled_flag && !BdpcmFlag[ x0 ][ y0 ] &&
            tbWidth <= MaxTsSize && tbHeight <= MaxTsSize )
            transform_skip_flag[ x0 ][ y0 ]                                                ae(v)
         if( ( ( CuPredMode[ chType ][ x0 ][ y0 ] = = MODE_INTER &&
            sps_explicit_mts_inter_enabled_flag )
            | | ( CuPredMode[ chType ][ x0 ][ y0 ] = = MODE_INTRA &&
            sps_explicit_mts_intra_enabled_flag ) ) && ( !transform_skip_flag[ x0 ][ y0 ] ) )
            tu_mts_idx[ x0 ][ y0 ]                                                         ae(v)
      }
      if( tu_cbf_luma[ x0 ][ y0 ] ) {
         if( !transform_skip_flag[ x0 ][ y0 ] )
            residual_coding( x0, y0, Log2( tbWidth ), Log2( tbHeight ), 0 )
         else
            residual_ts_coding( x0, y0, Log2( tbWidth ), Log2( tbHeight ), 0 )
      }
      if( tu_cbf_cb[ x0 ][ y0 ] )
         residual_coding( xC, yC, Log2( wC ), Log2( hC ), 1 )
      if( tu_cbf_cr[ x0 ][ y0 ] &&
        !( tu_cbf_cb[ x0 ][ y0 ] && tu_joint_cbcr_residual_flag[ x0 ][ y0 ] )) {
         residual_coding( xC, yC, Log2( wC ), Log2( hC ), 2 )
      }
}
```

It should be noted that this affects directly the subblock transform (SBT) tool. SBT is a transform unit partitioning tool for inter blocks that implicitily selects the transforms from DCT2, DST7 and DCT8. According to the specification:

The variable implicitMtsEnabled is derived as follows:

If sps_mts_enabled_flag is equal to 1 and one of the following conditions is true, implicitMtsEnabled is set equal to 1:

IntraSubPartitionsSplitType is not equal to ISP_NO_SPLIT cu_sbt_flag is equal to 1 and Max(nTbW, nTbH) is less than or equal to 32 sps_explicit_mts_intra_enabled_flag is equal to 0 and CuPredMode[0][xTbY][yTbY] is equal to MODE_INTRA and lfnst_idx[x0][y0] is equal to 0 and intra_mip_flag[x0][y0] is equal to 0

Otherwise, implicitMtsEnabled is set equal to 0.

The variable trTypeHor specifying the horizontal transform kernel and the variable trTypeVer specifying the vertical transform kernel are derived as follows:

If cIdx is greater than 0, trTypeHor and trTypeVer are set equal to 0.

Otherwise, if implicitMtsEnabled is equal to 1, the following applies:

If IntraSubPartitionsSplitType is not equal to ISP_NO_SPLIT or sps_explicit_mts_intra_enabled_flag is equal to 0 and CuPredMode[0][xTbY][yTbY] is equal to MODE_INTRA, trTypeHor and trTypeVer are derived as follows:

$$trTypeHor=(nTbW>=4 \&\& nTbW<=16)?1:0 \quad (8\text{-}975)$$

$$trTypeVer=(nTbH>=4 \&\& nTbH<=16)?1:0 \quad (8\text{-}976)$$

Otherwise (cu_sbt_flag is equal to 1), trTypeHor and trTypeVer are specified in Table 8-15 depending on cu_sbt_horizontal_flag and cu_sbt_pos_flag.
Otherwise, trTypeHor and trTypeVer are specified in Table 8-14 depending on tu_mts_idx[xTbY][yTbY].

TABLE 8-15

Specification of trTypeHor and trTypeVer depending on cu_sbt_horizontal_flag and cu_sbt_pos_flag

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

Where transform type of 2 means DCT8 and 1 means DST7.

That is, when MTS is restricted to MaxTbSizeY/2 and MaxTbSizeY is 32, the above table cannot be used since DST7 and DCT8 of size 32×32 are not supported. Instead DCT2 should be used. The corresponding specification change is as follows:

The variable implicitMtsEnabled is derived as follows:
If sps_mts_enabled_flag is equal to 1 and one of the following conditions is true, implicitMtsEnabled is set equal to 1:
IntraSubPartitionsSplitType is not equal to ISP_NO_SPLIT
cu_sbt_flag is equal to 1 and Max(nTbW, nTbH) is less than or equal to MaxTbSizeY/2
sps_explicit_mts_intra_enabled_flag is equal to 0 and CuPredMode[0][xTbY][yTbY] is equal to MODE_INTRA and lfnst_idx[x0][y0] is equal to 0 and intra_mip_flag[x0][y0] is equal to 0

Embodiment 3: Chroma Transform Size

According to VVC spec, chroma maximum transform width and height can be half of the maximum luma one. However, as the maximum luma transform size can be 32, the maximum size of chroma can be 16. This seems to be small number and not useful in practice. Therefore, this embodiment fixes the minimum of chroma size to be 32. The specification can be changed as follows (in italics):

maxTbWidth=(cIdx==0)?MaxTbSizeY:max(MaxTbSizeY/SubWidthC,32) (8-41)

maxTbHeight=(cIdx==0)?MaxTbSizeY:max(MaxTbSizeY/SubHeightC,32)(8-42)

Embodiment 4: Transform Skip Size

The transform skip flag can be signaled up to sizes of 32×32. This is independent of maximum transform block size, whether 64 or 32. To make the connection with maximum transform size, the text is modified as follows:
log 2_transform_skip_max_size_minus2 specifies the maximum block size used for transform skip, and shall be in the range of 0 to MaxTbLog2SizeY−3.
Where MaxTbLog2SizeY is computed as follows (according to WC Spec):

MaxTbLog2SizeY=sps_max_luma_transform_size_64_flag?6:5 (7-28)

Embodiment 5: BDCM

BDPCM uses the same conditions to be signaled as transform skip. So, the above embodiment 4 is applicable for BDPCM as well.

Embodiment 6: MIP

The described general aspects propose enabling MIP for CU's up to 64×64, regardless of the maximum transform size. This is done by enabling TU tiling when the CU size is larger than MaxTbSizeY. This is to improve the coding efficiency when MaxTbSizeY is 32.

The basic idea of the invention is to allowed MIP for CU's up to sizes 64×64, regardless of the MaxTbSizeY. This is to improve the coding performance when MaxTbSizeY is set to 32 by enabling MIP when the CU size is larger than 32×32. Experimentally, it is shown that MIP performs better for sequences with large dimensions. The results below are generated by taking VTM software as anchor and the test is VTM without MIP:

| | Over VTM-5.0 | | | | |
|---|---|---|---|---|---|
| | Y | U | V | EncT | DecT |
| Class A1 | 0.59% | 0.32% | 0.27% | 86% | 101% |
| Class A2 | 0.33% | 0.03% | 0.00% | 88% | 100% |
| Class B | 0.29% | 0.00% | 0.10% | 86% | 100% |
| Class C | 0.30% | 0.10% | 0.21% | 87% | 99% |
| Class E | 0.33% | 0.10% | 0.11% | 87% | 100% |
| Overall | 0.36% | 0.10% | 0.14% | 87% | 100% |
| Class D | 0.37% | 0.36% | 0.08% | 88% | 97% |
| Class F | 0.19% | 0.19% | 0.21% | 92% | 100% |

Clearly, MIP gives 0.6% gain for class A1 (large dimension) and 0.3 for class C (small dimension). Therefore, enabling MIP for 64×64 CU's when MaxTbSizeY is 32 provides coding benefit for sequences with large dimension. Further, it doesn't require any additional tools since the same structure of MIP is maintained.

Compared to the current design, it allows more flexibility to the encoder to perform MIP for CU's up to 64×64, even if the transform size is smaller.

This can be achieved by TU tiling. That is, diving the CU into multiple TU's and perform MIP independently. There are two ways to do that:

1—TU tiling then MIP Prediction

2—TU tiling after MIP prediction

That is, given CU of size 64×64, 32×64 or 64×32 and MaxTbSizeY is 32, the first option is to divide the CU into TU's of 32×32 perform MIP on 32×32 blocks to generate the prediction signal and code the residual. When doing so, the reference samples from the reconstructed 32×32 blocks can be used to generate the prediction signal. The second option is to perform MIP with the large CU (64×64, 32×64 or 64×32), then divide the CU into TU's of size 32×32 and code the residual. The second option is more in line with current design of VTM. This is because for the conventional intra prediction (angular, DC or planar), the prediction signal is generated with the same size as TU's, so that the reference samples reconstructed blocks can be used to improve the prediction of the neighboring blocks.

The corresponding specification text is shown below in italics:

| | Descriptor |
|---|---|
| coding_unit( x0, y0, cbWidth, cbHeight, cqtDepth, treeType, modeType ) { | |
|   chType = treeType = = DUAL_TREE_CHROMA? 1 : 0 | |
|   if( slice_type != I \|\| sps_ibc_enabled_flag \|\| sps_palette_enabled_flag) { | |
|     if( treeType != DUAL_TREE_CHROMA && | |
|       !( ( ( cbWidth = = 4 && cbHeight = = 4 ) \|\| modeType = = MODE_TYPE_INTRA ) | |
|       && !sps_ibc_enabled_flag ) ) | |
|       cu_skip_flag[ x0 ][ y0 ] | ae(v) |
|     if( cu_skip_flag[ x0 ][ y0 ] = = 0 && slice_type != I | |
|     && !( cbWidth = = 4 && cbHeight = = 4 ) && modeType = = MODE_TYPE_ALL ) | |
|       pred_mode_flag | ae(v) |
|     if( ( ( slice_type = = I && cu_skip_flag[ x0 ][ y0 ] = =0 ) \|\| | |
|       ( slice_type != I && ( CuPredMode[ chType ][ x0 ][ y0 ] != MODE_INTRA \|\| | |
|       ( cbWidth = = 4 && cbHeight = = 4 && cu_skip_flag[ x0 ][ y0 ] = = 0 ) ) ) ) && | |
|       cbWidth <= 64 && cbHeight <= 64 && modeType != MODE_TYPE_INTER && | |
|       sps_ibc_enabled_flag && treeType != DUAL_TREE_CHROMA ) | |
|       pred_mode_ibc_flag | ae(v) |
|     if( ( ( slice_type = = I \|\| ( cbWidth = = 4 && cbHeight = = 4 ) \|\| sps_ibc_enabled_flag ) && | |
|       CuPredMode[ x0 ][ y0 ] = = MODE_INTRA ) \|\| | |
|       ( slice_type != I && !( cbWidth = = 4 && cbHeight = = 4 ) && !sps_ibc_enabled_flag | |
|       && CuPredMode[ x0 ][ y0 ] != MODE_INTRA ) ) && sps_palette_enabled_flag && | |
|       cbWidth <= 64 && cbHeight <= 64 && && cu_skip_flag[ x0 ][ y0 ] = = 0 && | |
|       modeType != MODE_INTER ) | |
|       pred_mode_plt_flag | ae(v) |
|   } | |
|   if( CuPredMode[ chType ][ x0 ][ y0 ] = = MODE_INTRA \|\| | |
|     CuPredMode[ chType ][ x0 ][ y0 ] = = MODE_PLT ) { | |
|     if( treeType = = SINGLE_TREE \|\| treeType = = DUAL_TREE_LUMA ) { | |
|       if( pred_mode_plt_flag ) { | |
|         if( treeType = = DUAL_TREE_LUMA ) | |
|           palette_coding( x0, y0, cbWidth, cbHeight, 0, 1 ) | |
|         else /* SINGLE_TREE */ | |
|           palette_coding( x0, y0, cbWidth, cbHeight, 0, 3 ) | |
|       } else { | |
|         if( sps_bdpcm_enabled_flag && | |
|           cbWidth <= MaxTsSize && cbHeight <= MaxTsSize ) | |
|           intra_bdpcm_flag | ae(v) |
|         if( intra_bdpcm_flag ) | |
|           intra_bdpcm_dir_flag | ae(v) |
|         else { | |
|           if( sps_mip_enabled_flag && | |
|             ( Abs( Log2( cbWidth ) − Log2( cbHeight ) ) < = 2 ) && | |
|             cbWidth <= MaxTbSizeY && cbHeight <= ~~MaxTbSizeY~~ 64) | |
|           intra_mip_flag[ x0 ][ y0 ] | ae(v) |
|           if( intra_mip_flag[ x0 ][ y0 ] ) | |
|             intra_mip_mode[ x0 ][ y0 ] | ae(v) |
|           else { | |
|             if( sps_mrl_enabled_flag && ( ( y0 % CtbSizeY ) > 0 ) ) | |
|               intra_luma_ref_idx[ x0 ][ y0 ] | ae(v) |
|             if ( sps_isp_enabled_flag && intra_luma_ref_idx[ x0 ][ y0 ] = = 0 && | |
|               ( cbWidth <= MaxTbSizeY && cbHeight <= MaxTbSizeY ) && | |
|               ( cbWidth * cbHeight > MinTbSizeY * MinTbSizeY ) ) | |
|               intra_subpartitions_mode_flag[ x0 ][ y0 ] | ae(v) |
|             if( intra_subpartitions_mode_flag[ x0 ][ y0 ] = = 1 ) | |
|               intra_subpartitions_split_flag[ x0 ][ y0 ] | ae(v) |
|             if( intra_luma_ref_idx[ x0 ][ y0 ] = = 0 ) | |
|               intra_luma_mpm_flag[ x0 ][ y0 ] | ae(v) |
|             if( intra_luma_mpm_flag[ x0 ][ y0 ] ) { | |
|               if( intra_luma_ref_idx[ x0 ][ y0 ] = = 0 ) | |
|                 intra_luma_not_planar_flag[ x0 ][ y0 ] | ae(v) |
|               if( intra_luma_not_planar_flag[ x0 ][ y0 ] ) | |
|                 intra_luma_mpm_idx[ x0 ][ y0 ] | ae(v) |
|             } else | |
|               intra_luma_mpm_remainder[ x0 ][ y0 ] | ae(v) |
|           } | |
|           } | |
|         } | |
|       } | |
|     } | |
|     ... | |

The specification text already support TU tiling when the transform unit dimensions are larger than maximum transform size, this is indicated in the text below (shaded)

```
transform_tree( x0, y0, tbWidth, tbHeight, treeType, chType ) {
  InferTuCbfLuma = 1
  if( IntraSubPartitionsSplitType = = ISP_NO_SPLIT && !cu_sbt_flag ) {
    if( tbWidth > MaxTbSizeY | | tbHeight > MaxTbSizeY ) {
      verSplitFirst = ( tbWidth > MaxTbSizeY && tbWidth > tbHeight ) ? 1 : 0
      trafoWidth = verSplitFirst ? (tbWidth / 2) : tbWidth
      trafoHeight = !verSplitFirst ? (tbHeight / 2) : tbHeight
      transform_tree( x0, y0, trafoWidth, trafoHeight, chType )
      if( verSplitFirst )
        transform_tree( x0 + trafoWidth, y0, trafoWidth, trafoHeight, treeType, chType )
      else
        transform_tree( x0, y0 + trafoHeight, trafoWidth, trafoHeight, treeType, chType )
    } else {
      transform_unit( x0, y0, tbWidth, tbHeight, treeType, 0, chType )
    }
  } else if( cu_sbt_flag ) {
    if( !cu_sbt_horizontal_flag ) {
      trafoWidth = tbWidth * SbtNumFourthsTb0 / 4
      transform_unit( x0, y0, trafoWidth, tbHeight, treeType , 0, 0 )
      transform_unit( x0 + trafoWidth, y0, tbWidth − trafoWidth, tbHeight, treeType, 1, 0 )
    } else {
      trafoHeight = tbHeight * SbtNumFourthsTb0 / 4
      transform_unit( x0, y0, tbWidth, trafoHeight, treeType , 0, 0 )
      transform_unit( x0, y0 + trafoHeight, tbWidth, tbHeight − trafoHeight, treeType, 1, 0 )
    }
  } else if( IntraSubPartitionsSplitType = = ISP_HOR_SPLIT ) {
    trafoHeight = tbHeight / NumIntraSubPartitions
    for( partIdx = 0; partIdx < NumIntraSubPartitions; partIdx++ )
      transform_unit( x0, y0 + trafoHeight * partIdx, tbWidth, trafoHeight, treeType, partIdx, 0 )
  } else if( IntraSubPartitionsSplitType = = ISP_VER_SPLIT ) {
    trafoWidth = tbWidth / NumIntraSubPartitions
    for( partIdx = 0; partIdx < NumIntraSubPartitions; partIdx++ )
      transform_unit( x0 + trafoWidth * partIdx, y0, trafoWidth, tbHeight, treeType, partIdx, 0 )
  }
}
```

Embodiment 7: LFNST Index

In the specification text, LFNST (low-frequency non-separable transform) is allowed up to MaxTbSizeY. The initial motivation was to avoid latency issue when decoding large CU's of size 128×128 where the LFNST index is decoded after decoding the TU residuals. Therefore, it was decided to allow LFNST up to the max transform size that was initially 64. With the adoption of JVET-O0545, the problem of latency is not critical for when CU size is 64×64 and MaxTbSizeY is 32. Therefore, we can allow LFNST index in this case to improve the coding gain when MaxTbSIzeY is set to 32.

The corresponding specification change is italicized:

| | Descriptor |
|---|---|
| coding_unit( x0, y0, cbWidth, cbHeight, cqtDepth, treeType, modeType ) { | |
|   if( cu_cbf ) { | |
|     if( CuPredMode[ chType ][ x0 ][ y0 ] = = MODE_INTER && sps_sbt_enabled_flag | |
|       && !ciip_flag[ x0 ][ y0 ] && !MergeTriangleFlag[ x0 ][ y0 ] ) { | |
|     ... | |
|     LfnstDcOnly = 1 | |
|     LfnstZeroOutSigCoeffFlag = 1 | |
|     transform_tree( x0, y0, cbWidth, cbHeight, treeType ) | |
|     lfnstWidth = ( treeType = = DUAL_TREE_CHROMA ) ? cbWidth / SubWidthC | |
|       : cbWidth | |
|     lfnstHeight = ( treeType = = DUAL_TREE_CHROMA ) ? cbHeight / SubHeightC | |
|       : cbHeight | |
|     if( Min( lfnstWidth, lfnstHeight ) >= 4 && sps_lfnst_enabled_flag = = 1 && | |
|       CuPredMode[ chType ][ x0 ][ y0 ] = = MODE_INTRA && | |
|       IntraSubPartitionsSplitType = = ISP_NO_SPLIT && | |
|       ( !intra_mip_flag[ x0 ][ y0 ] | | Min( lfnstWidth, lfnstHeight ) >= 16 ) && | |
|       tu_mts_idx[ x0 ][ y0 ] = = 0 && Max( cbWidth, cbHeight ) <=~~MaxTbSizeY~~ *64*) { | |
|       if( LfnstDcOnly = = 0 && LfnstZeroOutSigCoeffFlag = = 1 ) | |
|         lfnst_idx[ x0 ][ y0 ] | ae(v) |
|     } | |
|   } | |

Further, as LFNST is only allowed when the primary transform is DCT2 (condition: tu_mts_idx[x0][y0]==0), this condition need to be checked for multiple TU's. The change is as follows:

|  | Descriptor |
|---|---|
| coding_unit( x0, y0, cbWidth, cbHeight, cqtDepth, treeType, modeType ) { <br>   if( cu_cbf ) { <br>     if( CuPredMode[ chType ][ x0 ][ y0 ] = = MODE_INTER && sps_sbt_enabled_flag <br>       && !ciip_flag[ x0 ][ y0 ] && !MergeTriangleFlag[ x0 ][ y0 ] ) { <br>     ... <br>     MTS_notDCT2 = 0 <br>     LfnstDcOnly = 1 <br>     LfnstZeroOutSigCoeffFlag = 1 <br>     transform_tree( x0, y0, cbWidth, cbHeight, treeType ) <br>     lfnstWidth = ( treeType = = DUAL_TREE_CHROMA ) ? cbWidth / SubWidthC <br>       : cbWidth <br>     lfnstHeight = ( treeType = = DUAL_TREE_CHROMA ) ? cbHeight / SubHeightC <br>       : cbHeight <br>     if( Min( lfnstWidth, lfnstHeight ) >= 4 && sps_lfnst_enabled_flag = = 1 && <br>       CuPredMode[ chType ][ x0 ][ y0 ] = = MODE_INTRA && <br>       IntraSubPartitionsSplitType = = ISP_NO_SPLIT && <br>       ( !intra_mip_flag[ x0 ][ y0 ] \|\| Min( lfnstWidth, lfnstHeight ) >= 16 ) && <br>       tu_mts_idx[ x0 ][ y0 ] = = 0 && Max( cbWidth, cbHeight ) <= ~~MaxTbSizeY~~ 64) { <br>       if( ~~LfnstDcOnly == 0~~ MTS_notDCT2 = = 0 && LfnstZeroOutSigCoeffFlag = = 1 ) <br>         lfnst_idx[ x0 ][ y0 ] <br>     } <br>   } <br> } |  <br> <br> <br> <br> <br> <br> <br> <br> <br> <br> <br> <br> <br> <br> <br> <br> <br> <br> <br> <br> <br> <br> ae(v) |

|  | Descriptor |
|---|---|
| transform_unit( x0, y0, tbWidth, tbHeight, treeType, subTuIndex, chType ) { <br>   if( sps_joint_cbcr_enabled_flag && ( ( CuPredMode[ chType ][ x0 ][ y0 ] = = MODE_INTRA <br>     && ( tu_cbf_cb[ x0 ][ y0 ] \|\| tu_cbf_cr[ x0 ][ y0 ] ) ) \|\| <br>     ( tu_cbf_cb[ x0 ][ y0 ] && tu_cbf_cr[ x0 ][ y0 ] ) ) ) <br>     tu_joint_cbcr_residual_flag[ x0 ][ y0 ] <br>   if( tu_cbf_luma[ x0 ][ y0 ] && treeType != DUAL_TREE_CHROMA <br>     && ( tbWidth <= 32 ) && ( tbHeight <= 32 ) <br>     && ( IntraSubPartitionsSplit[ x0 ][ y0 ] = = ISP_NO_SPLIT ) && ( !cu_sbt_flag ) ) { <br>     if( sps_transform_skip_enabled_flag && !BdpcmFlag[ x0 ][ y0 ] && <br>       tbWidth <= MaxTsSize && tbHeight <= MaxTsSize ) <br>       transform_skip_flag[ x0 ][ y0 ] <br>     if( ( ( CuPredMode[ chType ][ x0 ][ y0 ] = = MODE_INTER && <br>       sps_explicit_mts_inter_enabled_flag ) <br>       \|\| ( CuPredMode[ chType ][ x0 ][ y0 ] = = MODE_INTRA && <br>       sps_explicit_mts_intra_enabled_flag ) ) && ( !transform_skip_flag[ x0 ][ y0 ] ) ) <br>       tu_mts_idx[ x0 ][ y0 ] <br>     if ( tu_mts_idx[x0][y] > 0) <br>       MTS_notDCT2 = 1 <br>   } <br> } |  <br> <br> <br> <br> ae(v) <br> <br> <br> <br> <br> ae(v) <br> <br> <br> <br> <br> <br> ae(v) |

That is, we define a variable MTS_notDCT2 that checks if any of the TU's is not using DCT2. If so, LFNST is not allowed.

Figure 4:
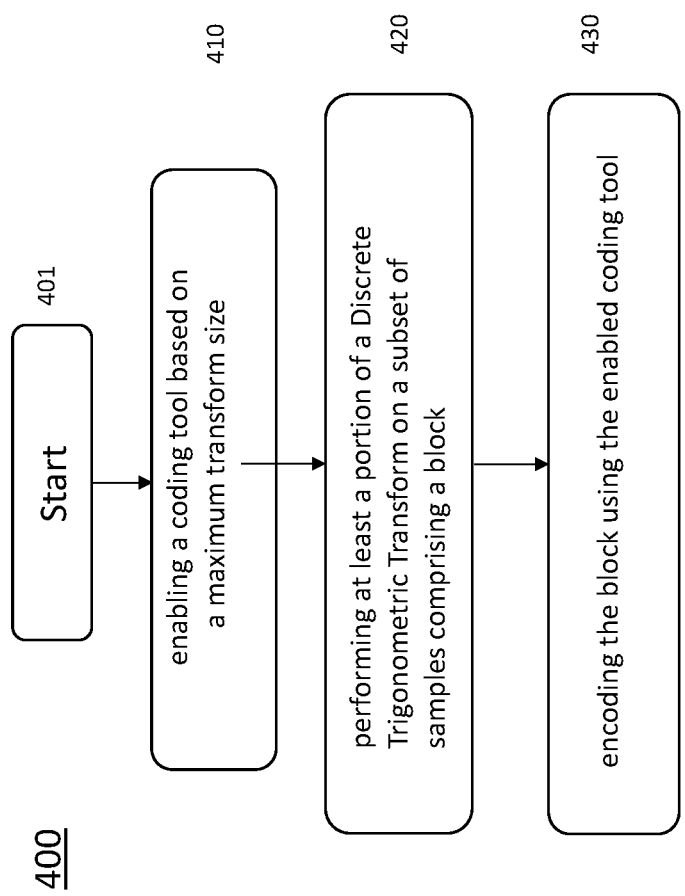
FIG. 4 shows one embodiment of a method under the described aspects.

One embodiment of a method 400 under the general aspects described here is shown in FIG. 4. The method commences at start block 401 and control proceeds to block 410 for enabling a coding tool based on a maximum transform size. Control proceeds from block 410 to block 420 for performing at least a portion of a Discrete Trigonometric Transform on a subset of samples comprising a block. Control proceeds from block 420 to block 430 for encoding the block using the enabled coding tool. determining transform coefficients for the block using the transformed subset of samples.

Figure 5:
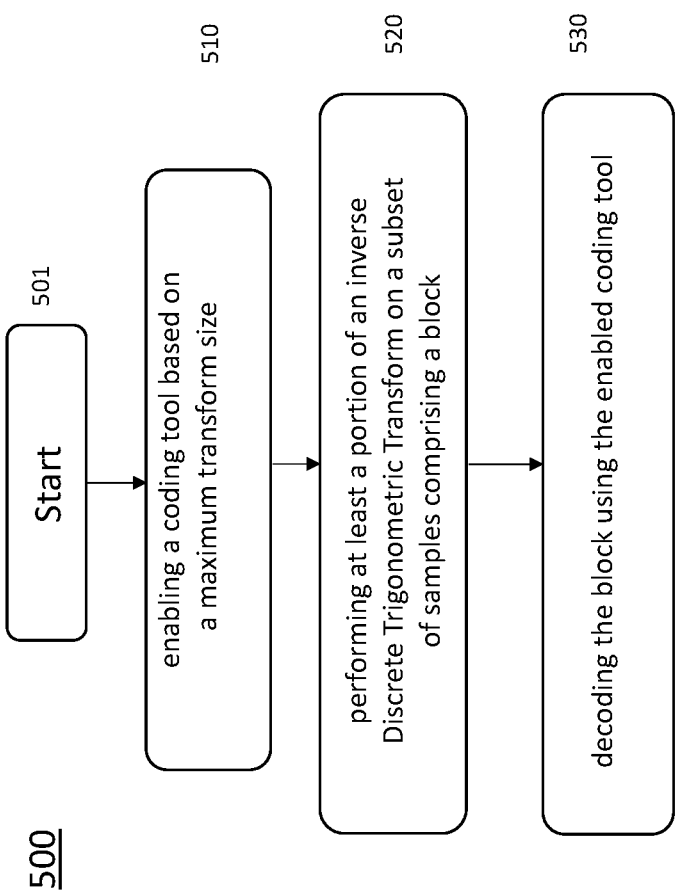
FIG. 5 shows another embodiment of a method under the described aspects.

One embodiment of a method 500 under the general aspects described here is shown in FIG. 5. The method commences at start block 501 and control proceeds to block 510 for enabling a coding tool based on a maximum transform size. Control proceeds from block 510 to block 520 for performing at least a portion of an inverse Discrete Trigonometric Transform on a subset of samples comprising a block. Control proceeds from block 520 to block 530 for decoding the block using the enabled coding tool.

Figure 6:
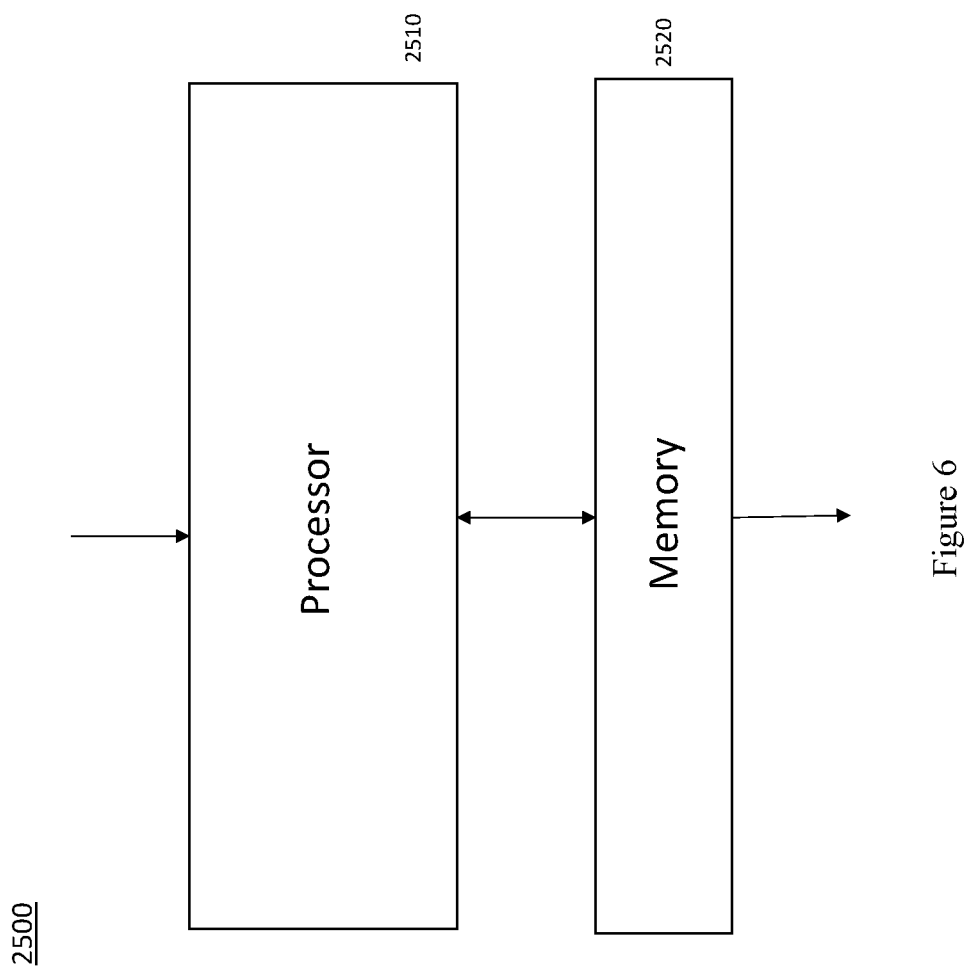
FIG. 6 shows an example apparatus under the described aspects.

FIG. 6 shows one embodiment of an apparatus 600 for compressing, encoding or decoding video using various coding tools depending on a maximum transform size. The apparatus comprises Processor 1410 and can be interconnected to a memory 1420 through at least one port. Both Processor 1410 and memory 1420 can also have one or more additional interconnections to external connections.

Processor 610 is also configured to either insert or receive information in a bitstream and, either compressing, encoding or decoding using any of the described aspects.

This document describes a variety of aspects, including tools, features, embodiments, models, approaches, etc.

Many of these aspects are described with specificity and, at least to show the individual characteristics, are often described in a manner that can sound limiting. However, this is for purposes of clarity in description, and does not limit the application or scope of those aspects. Indeed, all the different aspects can be combined and interchanged to provide further aspects. Moreover, the aspects can be combined and interchanged with aspects described in earlier filings as well.

Figure 2:
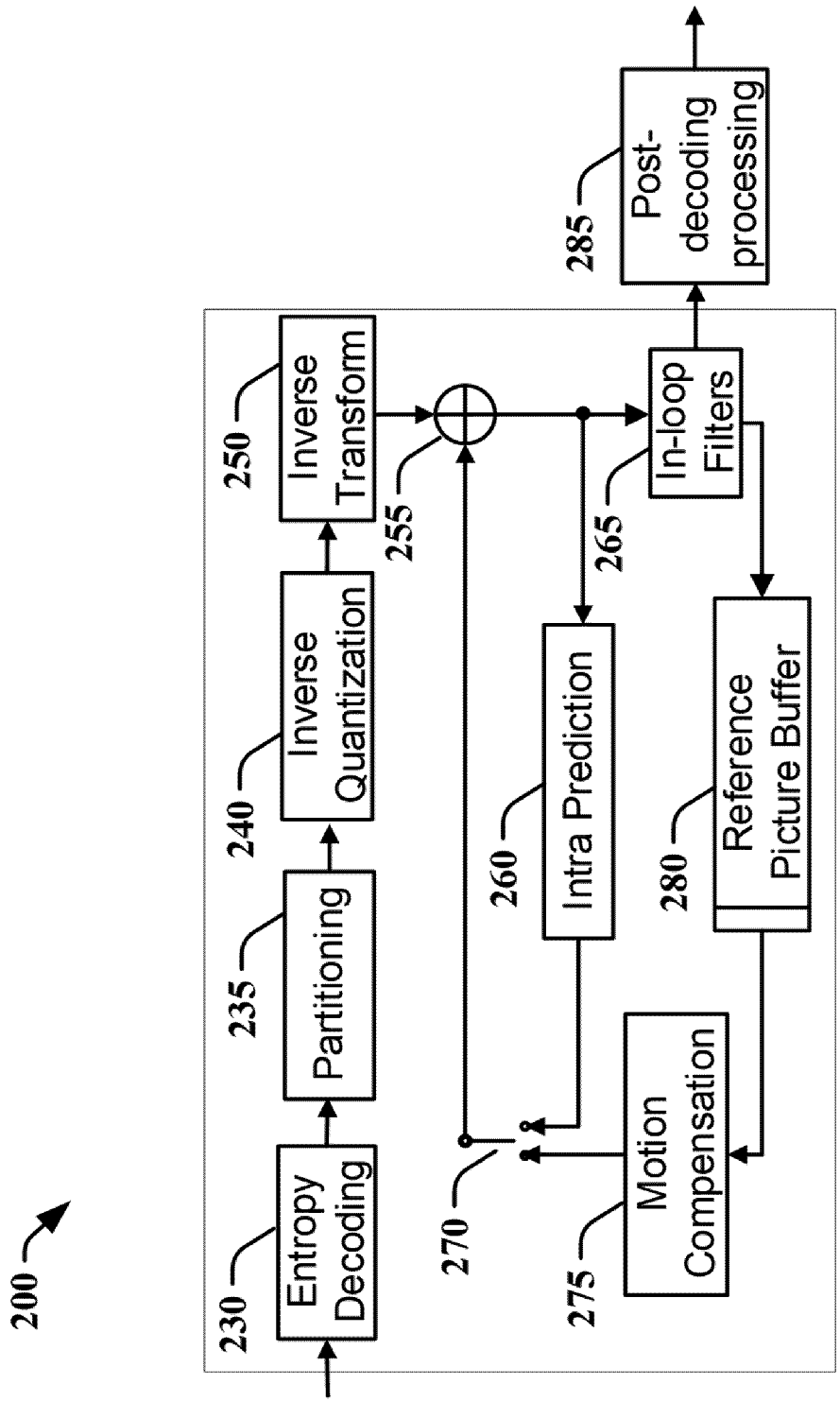
FIG. 2 shows a standard, generic video decompression scheme.
Figure 3:
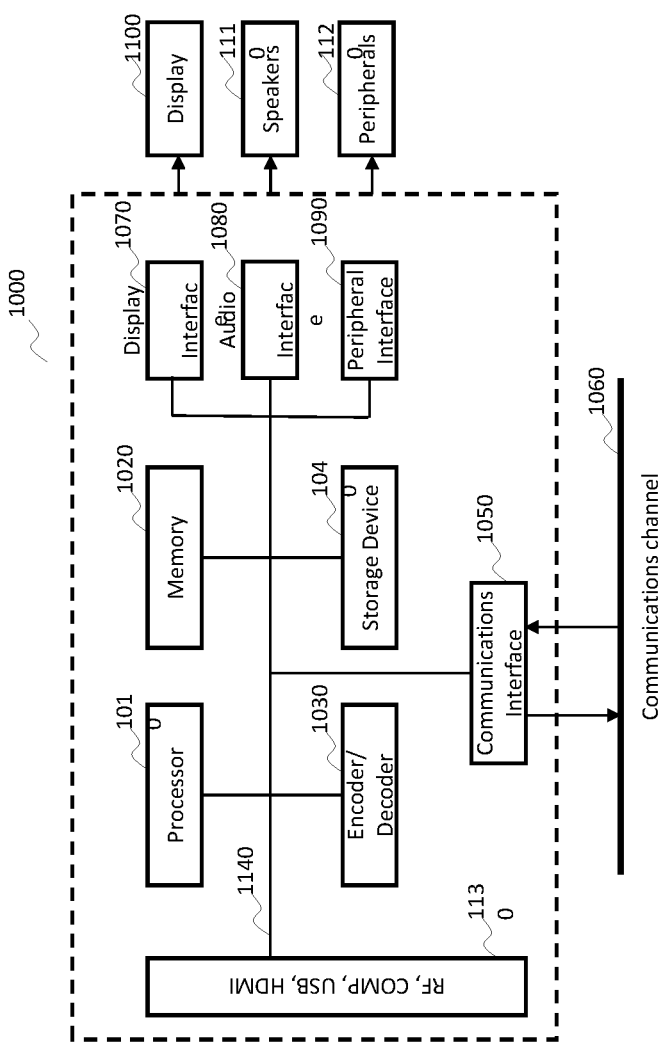
FIG. 3 shows an example processor-based subsystem for implementation of general described aspects.

The aspects described and contemplated in this document can be implemented in many different forms. FIGS. 1, 2, and 3 below provide some embodiments, but other embodiments are contemplated and the discussion of FIGS. 1, 2, and 3 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the intra prediction, entropy coding, and/or decoding modules (160, 360, 145, 330), of a video encoder 100 and decoder 200 as shown in FIG. 1 and FIG. 2. Moreover, the present aspects are not limited to WC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example, {{1,0}, {3,1}, {1,1}}. The specific values are for example purposes and the aspects described are not limited to these specific values.

FIG. 1 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a video decoder 200. In the decoder 200, a bitstream is decoded by the decoder elements as described below. Video decoder 200 generally performs a decoding pass reciprocal to the encoding pass as described FIG. 1. The encoder 100 also generally performs video decoding as part of encoding video data.

The input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 3 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast, external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lowerfrequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a wireless network, such as IEEE 802.11. The wireless signal of these embodiments is received over the communications channel 1060 and the communications interface 1050 which are adapted for Wi-Fi communications, for example. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting an index of weights to be used for the various intra prediction reference arrays.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, weighting of intra prediction reference arrays.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion calculation or rate distortion optimization. During the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of weights to be used for intra prediction reference arrays. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Embodiments may include one or more of the following features or entities, alone or in combination, across various different claim categories and types:

Enabling matrix-based intra prediction for coding units up to a determined size, regardless of the maximum transform size.

Enabling transform unit tiling when a coding unit size is larger than a maximum transform size.

Enabling low-frequency non-separable transforms (LFNST) up to a determined size.

Including in a bitstream, or checking a bitstream for, a syntax element that indicates if any transform units are not using DCT2 as a transform and not allowing LFNST if so indicated.

A bitstream or signal that includes one or more of the described syntax elements, or variations thereof.

Creating and/or transmitting and/or receiving and/or decoding a bitstream or signal that includes one or more of the described syntax elements, or variations thereof.

A TV, set-top box, cell phone, tablet, or other electronic device that performs in-loop filtering according to any of the embodiments described.

A TV, set-top box, cell phone, tablet, or other electronic device that performs in-loop filtering according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs in-loop filtering according to any of the embodiments described.

A TV, set-top box, cell phone, tablet, or other electronic device that receives (e.g. using an antenna) a signal over the air that includes an encoded image, and performs in-loop filtering according to any of the embodiments described.

Various other generalized, as well as particularized, inventions and claims are also supported and contemplated throughout this disclosure.

The invention claimed is:

1. A method for video encoding, comprising:
   enabling, for a block, a matrix-based intra prediction (MIP) regardless of a maximum transform block size;
   dividing the block into multiple transform blocks of the maximum transform block size when a size of the block is larger than the maximum transform block size;
   performing matrix-based intra prediction of each block of the maximum transform block size to obtain a prediction; and
   encoding the block based on the prediction.

2. The method of claim 1, wherein the maximum transform block size is 32×32.

3. The method of claim 1, wherein the block size is 64×64, 64×32, or 32×64.

4. A non-transitory computer readable medium containing data content generated according to the method of claim 1 for playback using a processor.

5. The method of claim 1, wherein enabling, for the block, the matrix-based intra prediction (MIP) regardless of the maximum transform block size comprises encoding a MIP flag regardless of the maximum transform block size and encoding a MIP mode in a case where the MIP flag equals one.

6. The method of claim 1, wherein enabling, for the block, the matrix-based intra prediction (MIP) regardless of the maximum transform block size comprises enabling, for the block, the matrix-based intra prediction in a case where the block size is larger than the maximum transform block size.

7. An apparatus comprising at least one memory and one or more processors and coupled to the memory, wherein the one or more processors are configured to perform:
   enabling, for a block, a matrix-based intra prediction (MIP) regardless of a maximum transform block size;
   dividing the block into multiple transform blocks of the maximum transform block size when a size of the block is larger than the maximum transform block size;
   performing matrix-based intra prediction of each block of the maximum transform block size to obtain a prediction; and
   encoding the block based on the prediction.

8. The apparatus of claim 7, wherein the maximum transform block size is 32×32.

9. The apparatus of claim 7, wherein the block size is 64×64, 64×32, or 32×64.

10. The apparatus of claim 7, wherein enabling, for the block, the matrix-based intra prediction (MIP) regardless of the maximum transform block size comprises encoding a MIP flag regardless of the maximum transform block size and encoding a MIP mode in a case where the MIP flag equals one.

11. The apparatus of claim 7, wherein enabling, for the block, the matrix-based intra prediction (MIP) regardless of the maximum transform block size comprises enabling, for the block, the matrix-based intra prediction in a case where the block size is larger than the maximum transform block size.

12. A method for video decoding, comprising:
   enabling, for a block, a matrix-based intra prediction (MIP) regardless of a maximum transform block size;
   dividing the block into multiple transform blocks of the maximum transform block size when a size of the block is larger than the maximum transform block size;
   performing matrix-based intra prediction of each block of the maximum transform block size to obtain a prediction; and
   decoding the block based on the prediction.

13. The method of claim 12, wherein the maximum transform block size is 32×32.

14. The method of claim 12, wherein the block size is 64×64, 64×32, or 32×64.

15. The method of claim 12, wherein enabling, for the block, the matrix-based intra prediction (MIP) regardless of the maximum transform block size comprises decoding a MIP flag regardless of the maximum transform block size and decoding a MIP mode in a case where the MIP flag equals one.

16. The method of claim 12, wherein enabling, for the block, the matrix-based intra prediction (MIP) regardless of the maximum transform block size comprises enabling, for the block, the matrix-based intra prediction in a case where the block size is larger than the maximum transform block size.

17. An apparatus comprising at least one memory and one or more processors and coupled to the memory, wherein the one or more processors are configured to perform:
   enabling, for a block, a matrix-based intra prediction (MIP) regardless of a maximum transform block size;
   dividing the block into multiple transform blocks of the maximum transform block size when a size of the block is larger than the maximum transform block size;
   performing matrix-based intra prediction of each block of the maximum transform block size to obtain a prediction; and
   decoding the block based on the prediction.

18. A device comprising:
   the apparatus according to claim 17; and
   at least one of (i) an antenna configured to receive a signal, the signal including the block, (ii) a band limiter configured to limit the received signal to a band of frequencies that includes the block, or (iii) a display configured to display an output representative of a video block.

19. The apparatus of claim 17, wherein the maximum transform block size is 32×32.

20. The apparatus of claim 17, wherein the block size is 64×64, 64×32, or 32×64.

21. The apparatus of claim 17, wherein enabling, for the block, the matrix-based intra prediction (MIP) regardless of the maximum transform block size comprises decoding a MIP flag regardless of the maximum transform block size and decoding a MIP mode in a case where the MIP flag equal one.

22. The apparatus of claim 17, wherein enabling, for the block, the matrix-based intra prediction (MIP) regardless of the maximum transform block size comprises enabling, for the block, the matrix-based intra prediction in a case where the block size is larger than the maximum transform block size.

* * * * *